(12) United States Patent
Li et al.

(10) Patent No.: US 9,138,705 B2
(45) Date of Patent: Sep. 22, 2015

(54) METHOD FOR PRECIPITATING A SOLUTE FROM A SOLUTION

(75) Inventors: Yi Li, Hong Kong (CN); Footim Chau, Hong Kong (CN); Aizheng Chen, Hong Kong (CN); Junyan Hu, Hong Kong (CN); Tsuiyan Lau, Hong Kong (CN)

(73) Assignee: HONG KONG POLYTECHNIC UNIVERSITY, Kowloon, Hong Kong SAR (CN)

( * ) Notice: Subject to any disclaimer, the term of this patent is extended or adjusted under 35 U.S.C. 154(b) by 381 days.

(21) Appl. No.: 12/951,642

(22) Filed: Nov. 22, 2010

(65) Prior Publication Data

US 2012/0130066 A1    May 24, 2012

(51) Int. Cl.
*A61K 31/7048* (2006.01)
*C07H 15/26* (2006.01)
*B01J 3/04* (2006.01)
*B01J 3/00* (2006.01)
*B01D 11/04* (2006.01)
*B01J 4/00* (2006.01)

(52) U.S. Cl.
CPC ............. *B01J 3/008* (2013.01); *B01D 11/0411* (2013.01); *B01J 3/04* (2013.01); *B01J 4/002* (2013.01); *B01J 2204/002* (2013.01)

(58) Field of Classification Search
CPC .......................... A61K 31/7048; C07H 15/26
USPC ....................................................... 536/127
See application file for complete search history.

(56) References Cited

U.S. PATENT DOCUMENTS

| | | |
|---|---|---|
| 3,706,713 A | 12/1972 | Hull et al. |
| 3,900,424 A | 8/1975 | Inoue et al. |
| 3,953,383 A | 4/1976 | Inoue et al. |
| 4,066,630 A | 1/1978 | Dixon et al. |
| 4,145,525 A | 3/1979 | Dixon et al. |
| 4,166,898 A | 9/1979 | Kambe et al. |
| 4,500,704 A | 2/1985 | Kruper, Jr. et al. |
| 4,975,525 A | 12/1990 | Hostetler et al. |
| 5,725,836 A | 3/1998 | Rouanet et al. |
| 5,803,966 A | 9/1998 | Kulshreshtha et al. |
| 5,864,923 A | 2/1999 | Rouanet et al. |
| 6,063,910 A | 5/2000 | Debenedetti et al. |
| 6,830,714 B1 | 12/2004 | Avontuur et al. |
| 6,998,051 B2 | 2/2006 | Chattopadhyay et al. |
| 7,250,152 B2 | 7/2007 | Gentile et al. |
| 8,241,371 B2 * | 8/2012 | Hanna et al. .................. 23/300 |

FOREIGN PATENT DOCUMENTS

CN          1868484 A   * 11/2006

OTHER PUBLICATIONS

Pan J et al., CN 1868484 A, Nov. 2006, China, Derwent Abstract.*
Pan. J., Chinese Document No. CN 1868484 A , Machine Translated Copy, Nov. 29, 2006.*

* cited by examiner

*Primary Examiner* — Patrick Lewis
*Assistant Examiner* — Everett White
(74) *Attorney, Agent, or Firm* — Leydig, Voit & Mayer, Ltd.

(57) ABSTRACT

A solute is precipitated from a solution of a solute, a solvent, and a non-solvent by preparing the solution and introducing the solution into a precipitation chamber contain a supercritical fluid.

12 Claims, 2 Drawing Sheets

US 9,138,705 B2

METHOD FOR PRECIPITATING A SOLUTE FROM A SOLUTION

FIELD OF THE INVENTION

The present invention relates generally to a method for precipitating a solute from a solution. More particularly the invention relates to a method for prepare fine particles, especially the preparation of drug and/or polymer microparticles or nanoparticles, by precipitating a solute from a solution.

BACKGROUND TO THE INVENTION

Precipitation is the formation of a solid in a solution during a chemical reaction. The solid is called the precipitate, and the liquid remaining above the solid is called the supernate. Solvent/non-solvent precipitation is a technique commonly employed to isolate a substance in solid form from a solution. In this process the substance particles are obtained by dissolving the substance in a solvent and then precipitating the substance by combining the substance solution with a non-solvent. Adding a non-solvent to a substance solution increases the saturation ratio of the solution causing precipitation of the solute. The solvent and the non-solvent must be at least partially soluble in each other. U.S. Pat. No. 3,953,383, U.S. Pat. No. 4,166,898, U.S. Pat. No. 3,900,424, U.S. Pat. No. 4,500,704, U.S. Pat. No. 4,066,630, U.S. Pat. No. 4,145,525, U.S. Pat. No. 3,706,713 and U.S. Pat. No. 4,975,525 teach to dissolve polymers in certain solvents and to precipitate the polymers by adding the polymer solutions to certain non-solvents.

$CO_2$ is non-toxic, non-flammable, relatively inexpensive and recyclable gass. Its critical temperature and pressure (Tc=31.1 deg-C, Pc=7.38 MPa) are relatively mild. Supercritical $CO_2$—where $CO_2$ is in a fluid state while also being at or above its critical temperature and pressure—has several desirable features such as low viscosity and high solvent power for most organic solvents. Because most organic (carbon-containing) solvents are miscible (mix to foam a homogeneous solution) in supercritical $CO_2$, it acts a non-solvent in solvent/non-solvent precipitation. Technologies based on a supercritical anti-solvent (SAS) process have been wildly used for engineering microparticles and nanoparticles. Based on employing $CO_2$ as an anti-solvent for particle fabrication, the SAS methods include the follows: supercritical anti-solvent (GAS/SAS), precipitation with a compressed anti-solvent (PCA), aerosol solvent extraction system (ASES), solution-enhanced dispersion by supercritical $CO_2$ (SEDS), and supercritical anti-solvent with enhanced mass transfer (SAS-EM). These method re well known in he art.

In a SAS process, the substance organic solution is sprayed into a precipitation chamber where a supercritical fluid (anti-solvent) is present causing rapid contact between the two media. This generates a higher super-saturation ratio of the solution resulting in fast nucleation and growth.

The U.S. Pat. No. 5,725,836, U.S. Pat. No. 6,998,051, U.S. Pat. No. 5,803,966, U.S. Pat. No. 7,250,152, U.S. Pat. No. 6,063,910, U.S. Pat. No. 6,830,714 and U.S. Pat. No. 5,864,923 teach to use supercritical fluid as anti-solvent to precipitate or co-precipitate drugs and/or polymers.

SUMMARY OF THE INVENTION

It is an object of the present invention to provide a method for precipitating a solute from a solution which produces fine particles having a smaller particle size, narrower particle size distribution and/or higher yield than methods use hitherto, or at least to provide the public with a useful choice.

The object is achieved by adding an organic non-solvent to a supercritical anti-solvent process. Accordingly, the invention provides a method for precipitating a solute from a solution comprising preparing a solution of a solute, a solvent and a non-solvent, and introducing the solution containing the solvent and a non-solvent into a precipitation chamber containing a supercritical anti-solvent.

In a particular aspect the invention provides a method comprising:

(a) Dissolving a substance in a suitable organic solvent to form a solution. The solution containing the substance is preferably an organic solvent selected to be soluble with supercritical $CO_2$, and selected to dissolve the substance. In one aspect of the invention the a solution has a concentration preferably between 0.1% (wt/v) and 5.0% (wt/v), more preferably between 0.5% (wt/v) and 2.0% (wt/v).

(b) Adding a suitable organic non-solvent to the solution with agitation to increase the saturation ratio of the solution. The organic non-solvent is preferably one in which the substance is insoluble, and is selected to be miscible with the solvent in step (a), and also miscible in supercritical $CO_2$. In one aspect of the invention the volume ratio of non-solvent to solvent ranges from 0.2 to 5. In another aspect of the invention the saturation ratio of the solvent/non-solvent solution increases with the decreasing of concentration. Preferably the solvent/non-solvent solution is very close to saturated state.

(c) Using a supercritical anti-solvent process to precipitate the substance from the solvent/non-solvent solution of step (B). The solvent/non-solvent solution is sprayed through a stainless steel coaxial nozzle by an HPLC pump into the high-pressure vessel where a supercritical $CO_2$ is present causing rapid contact between the supercritical $CO_2$ and the solvent/non-solvent solution. The solvent/non-solvent solution is expanded greatly and instantaneously generating higher super-saturation ratio of the solution resulting in fast nucleation and growth, which consequently creates smaller particles. Preferably, the supercritical anti-solvent process employs a supercritical fluid as an anti-solvent, and includes but not limited to GAS/SAS, PCAS ASES, SEDS, and SAS-EM. In on aspect of the invention the supercritical anti-solvent process has a temperature range from 304.1 K to 354.1 K, a pressure range from 7.38 MPa to 30 MPa, a flow rate of solvent/non-solvent solution in the range from 0.02 ml/min to 9.98 ml/min and a flow rate of $CO_2$ in the range from 10 NL/h to 1000 NL/h.

Further objects and aspects of the invention will become apparent from the following description which is given by way of example only to help illustrate the invention.

DETAILED DESCRIPTION OF THE INVENTION

Figure 1:
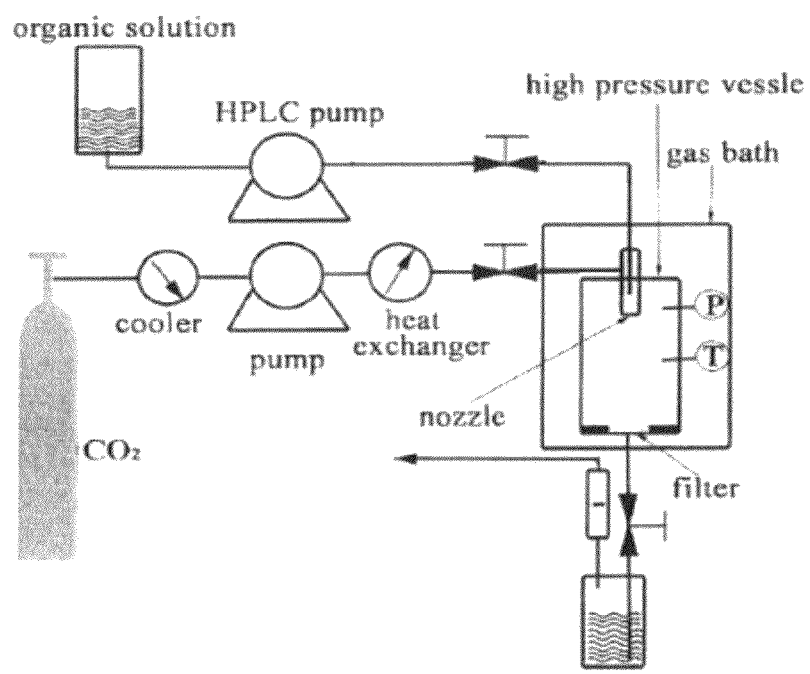
FIG. 1 is a schematic illustration of apparatus for a supercritical antisolvent process according to the invention, and FIG. 2 are scanning electron microscope (SEM) images of puerarin particles prepared in different parameters according to Table 1.

FIG. 1 illustrates apparatus for practicing the invention. Precipitation takes place in a high pressure vessel supplied with $CO_2$ from a $CO_2$ cylinder. The vessel is incubated in a gas bath to keep the temperature constant. The COs is feed into the high pressure via a cooler, pump and heat exchanger and is maintained in a supercritical state. Temperature and pressure sensors are provided in the vessel for monitoring the temperature and pressure of the CO2. During the precipitation reaction an organic solution can be feed into the high pressure vessel from a solution container using a HPLC pump. A stainless steel coaxial nozzle is used to disburse the organic solution within the high pressure vessel and ensure rapid contact with the supercritical within the vessel. The precipitate and supernate are extracted out of the vessel into a separation container via a filter and valve in the bottom of the vessel. The supernate can then be drawn off the percipitate.

The method of the invention will be illustrated by the production of fine particles of drug and/or polymer. The method comprises four main steps. Firstly, a substance is dissolved in a suitable organic solvent to form a solution. A suitable organic non-solvent is added into the solution with agitation to increase the saturation ratio of solution. When the solution reaches a saturated state, the organic non-solvent can not be added to keep the solution homogenous and prevent the precipitation of the substance. Thirdly, a supercritical anti-solvent process is used to precipitate the substance from the solution. As shown in FIG. 1, the said solution is sprayed through a stainless steel coaxial nozzle by an HPLC pump into the high-pressure vessel containing supercritical $CO_2$. This causes rapid contact between supercritical $CO_2$ and the mixture solvent/non-solvent. The solvent/non-solvent solution is expanded greatly and instantaneously generating a higher super-saturation ratio of the solution, resulting in fast nucleation and growth, and consequently creates smaller particles. Finally, when the spraying was finished, fresh $CO_2$ is used continually to wash the products to remove the residual organic solvent for about 30 minutes. During washing temperature and pressure are kept constant. After washing, the high pressure vessel was slowly depressurized and the products were collected.

It is important that the organic solvent, organic non-solvent and supercritical $CO_2$ are soluble in each other. It is preferred that the solution with a relatively low concentration be near saturated state by adding organic non-solvent to prepare fine particles of the substance with a smaller particle size and narrower particle size distribution.

The supercritical anti-solvent methods should be chosen based on employing $CO_2$ as an anti-solvent. Suitable methods known in the art include, but are not limited to, GAS/SAS, PCA, ASES, SEDS, and SAS-EM.

The particle size and particle size distribution are controlled by varying the solvent/non-solvent ratio, solution concentration, flow rate of solution, flow rate of $CO_2$, temperature and pressure of the $CO_2$. The inventors have found that when keeping the other parameters constant, but increasing of non-solvent ratio in the mixture to increase the saturation ratio of the solution, the method generates a faster precipitation during the supercritical anti-solvent process, the resulting particle size is greatly decreased, and the higher yield is obtained.

The following examples are meant to further illustrate, but not limit, the invention.

Example 1

Preparation of Puerarin Fine Particles

Table 1 below illustrates the yield, particle size and particle size distribution of puerarin particles prepared using different parameters of A: solvent/non-solvent, B: concentration (wt/v %), C: flow rate (mi/mm).

TABLE 1

| | | | | | | Particle size and particle size distribution | | | |
|---|---|---|---|---|---|---|---|---|---|
| Run | A | B | C | Yield (%) | Mean Size (um) | D10 | D50 | D90 | Span |
| a | 2:1 | 1.0 | 1.0 | 40.69 | 1.989 | 1.315 | 1.942 | 2.667 | 0.6962 |
| b | 1:2 | 1.0 | 1.0 | 72.73 | 0.4340 | 0.3334 | 0.4289 | 0.5774 | 0.5689 |
| c | 2:1 | 1.0 | 0.5 | 60.65 | 1.844 | 1.191 | 1.787 | 2.546 | 0.7583 |
| d | 1:2 | 1.0 | 0.5 | 80.58 | 0.3339 | 0.2384 | 0.3334 | 04732 | 0.7043 |
| e | 2:1 | 0.5 | 1.0 | 59.77 | 1.650 | 062 | 1.541 | 2.490 | 0.9267 |
| f | 1:2 | 0.5 | 1.0 | 74.91 | 0.3705 | 0.3069 | 0.3694 | 0.4606 | 0.4161 |
| g | 2:1 | 0.5 | 0.5 | 69.38 | 0.7658 | 0.4520 | 0.7358 | 1.024 | 0.7774 |
| h | 1:2 | 0.5 | 0.5 | 84.06 | 0.2562 | 0.1974 | 0.2632 | 0.3260 | 0.4886 |

Run (a) was conducted according to the following method. Three-hundred (300) mg of puerarin was dissolved in 20 ml ethanol, as an organic non-solvent of puerarin, 10 ml dichloromethane (DCM) was added into the solution of puerarin in ethanol to obtain a homogenous solution with a higher saturation ratio. In the running of supercritical anti-solvent process, the $CO_2$ fed from a $CO_2$ cylinder was cooled down to around 0° C. by the cooler in order to ensure the liquefaction of the gas and also to prevent cavitations. Then a high pressure meter pump was used to deliver liquefied $CO_2$ to the high pressure vessel. After leaving the pump head, the liquefied $CO_2$ was pre-heated to desired operating temperature by using a heat exchanger. The high pressure vessel was incubated in a gas bath to keep the temperature constant during the experiment. When the desired pressure of the high pressure vessel was reached, a steady flow of $CO_2$ was maintained, and the system pressure was controlled by adjusting a downstream valve and monitored by a pressure gauge to keep the pressure constant. When the desired pressure and temperature were stabilized, the puerarin solution was delivered into the high pressure vessel through a stainless steel coaxial nozzle by using an HPLC pump at a flow rate of 1.0 ml/min. During the process, the pressure, temperature and flow rate of $CO_2$ were kept as 12 MPa, 306 K and 25 NL/h, respectively. When the spraying was finished, fresh $CO_2$ was used continually to wash the products to remove the residual organic solvent for about 30 mm. During the process of washing, the system operating conditions were maintained as described before. After washing, the high pressure vessel was slowly depressurized and the products were collected.

Figure 2:
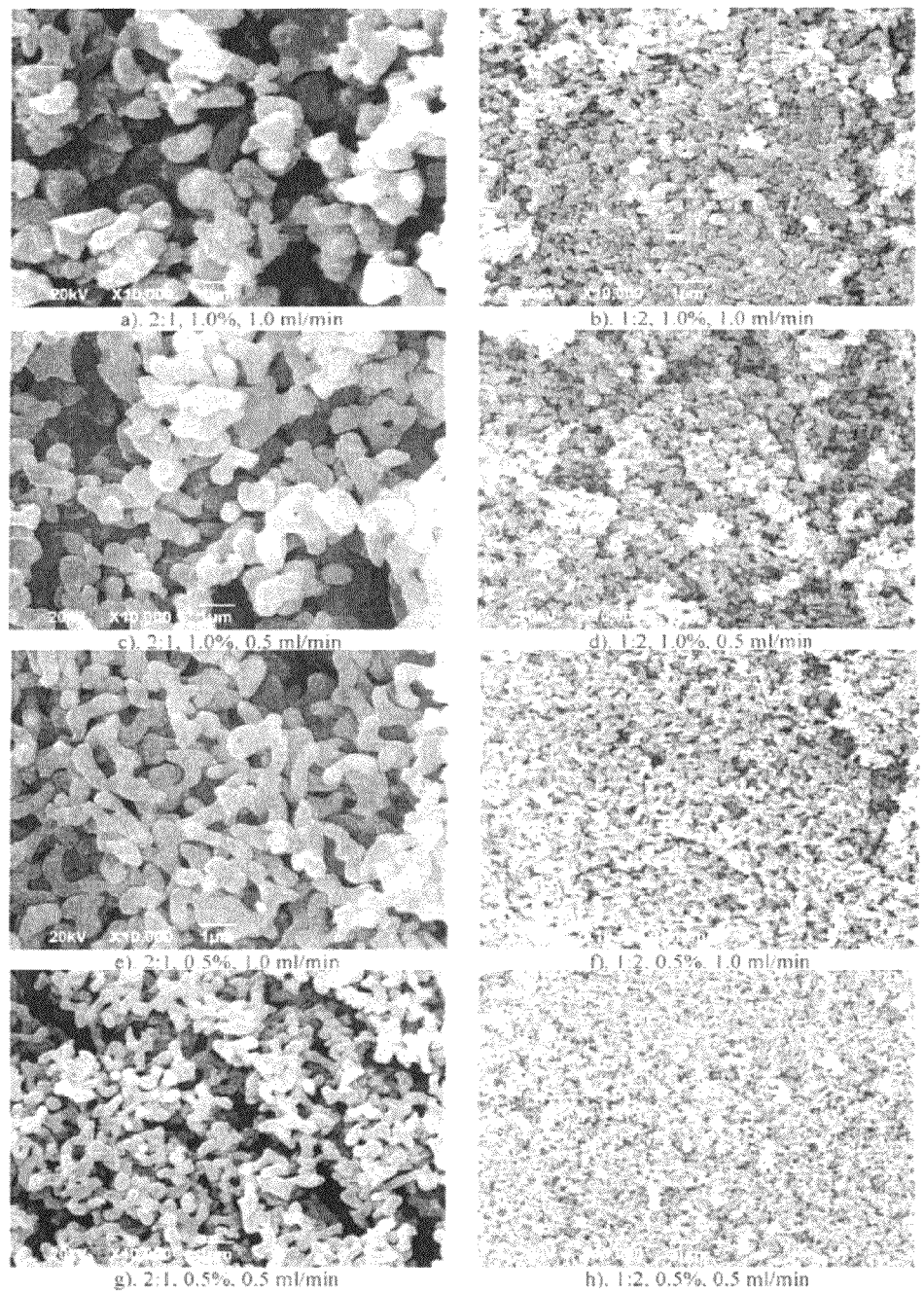

The run was repeated for the different parameters (b) through (h). Scanning electron microscope (SEM) images of puerarin particles prepared in different runs is illustrated in FIG. 2. It is evident that while the other parameters were kept in constant, with the increasing of non-solvent ratio in the puerarin solution, puerarin fine particle with much smaller particle size, much narrower particle size distribution and much higher yield were produced.

Example 2

60 mg poly(L-lactide) (PLLA) with a Mw of 100 KDa was dissolved in 20 ml DCM, then the said solution was added into 40 ml acetone which was a non-solvent for PLLA with high Mw, and agitating to resolve the precipitation as a homogeneous solution with a higher saturation ratio, then the PLLA solution was delivered into the high pressure vessel through a stainless steel coaxial nozzle by using an HPLC pump at a flow rate of 5.0 ml/mm, the pressure, temperature and flow rate of CO2 were set as 30 MPa, 304.1 K and 1000 NL/h, respectively. After spraying and washing by CO2, the high pressure vessel was slowly depressurized and the PLLA fine particles were collected.

Example 3

500 mg poly(L-lactide) (PLLA) with a Mw of 100 KDa was dissolved in mixture of 20 ml DCM and 5 ml acetone which was a non-solvent for PLLA with high Mw to obtain a homogeneous solution with a higher saturation ratio, then the PLLA solution was delivered into the high pressure vessel through a stainless steel coaxial nozzle by using an HPLC pump at a flow rate of 0.02 ml/mm, the pressure, temperature and flow rate of CO2 were set as 7.38 MPa, 323.0 K and 10 NL/h, respectively. After spraying and washing by CO2, the high pressure vessel was slowly depressurized and the PLLA fine particles were collected.

Example 4

50 mg 5-Fluorouracil was dissolved in 30 ml ethanol, then 20 ml DCM which was a non-solvent for 5-Fluorouracil was added in the said solution to obtain a homogeneous solution with a higher saturation ratio, then the 5-Fluorouracil solution was delivered into the high pressure vessel through a stainless steel coaxial nozzle by using an HPLC pump at a flow rate of 0.5 ml/min, the pressure, temperature and flow rate of CO2 were set as 7.38 MPa, 304.1 K and 50 NL/h, respectively. After spraying and washing by CO2, the high pressure vessel was slowly depressurized and the 5-Fluorouracil fine particles were collected.

What is claimed is:

1. A method for producing particles of puerarin, the method comprising:
   dissolving puerarin in an organic solvent to form a first solution,
   adding an organic non-solvent to the first solution, with agitation, to form a second solution, wherein
   the second solution has a higher saturation ratio than the first solution,
   the organic non-solvent is miscible with the organic solvent, and
   the puerarin is insoluble in the organic solvent, and
   spraying the second solution into a high pressure vessel containing a supercritical anti-solvent, under pressure, and contacting the second solution with the supercritical anti-solvent, thereby precipitating particles of puerarin having a mean particle size less than 2 μm and a narrower particle size distribution from the second solution.

2. The method of claim 1 wherein the organic solvent is miscible with the supercritical anti-solvent.

3. The method of claim 1 wherein the first solution has a concentration of between 0.1% (wt/v) and 5.0% (wt/v) of the precursor puerarin.

4. The method of claim 1 wherein the first solution has a concentration of between 0.5% (wt/v) and 2.0% (wt/v) of the precursor puerarin.

5. The method of claim 1 wherein the organic non-solvent is miscible with the supercritical anti-solvent.

6. The method of claim 1 wherein volume ratio of the organic non-solvent to the organic solvent is in a range from 0.2-1 to 5-1.

7. The method of claim 6 wherein the organic solvent is ethanol.

8. The method of claim 6 wherein the organic non-solvent is dichloromethane.

9. The method of claim 1 wherein introducing the second solution into a high pressure vessel containing a supercritical anti-solvent, under pressure, and precipitating the particles of puerarin having a mean particle size less than 2 μm and narrower particle size distribution from the second solution includes a process selected from the group consisting of:
   supercritical anti-solvent precipitation (GAS/SAS),
   precipitation with a compressed anti-solvent (PCA, ASES),
   solution-enhanced dispersion by supercritical $CO_2$ (SEDS), and
   supercritical anti-solvent precipitation with enhanced mass transfer (SAS-EM).

10. The method of claim 1 wherein the organic solvent is ethanol.

11. The method of claim 1 wherein the organic non-solvent is dichloromethane.

12. The method of claim 1, wherein the supercritical anti-solvent is supercritical $CO_2$.

* * * * *